United States Patent
Kobayashi

[15] 3,672,277
[45] June 27, 1972

[54] DEVICE FOR IDENTIFYING PHOTOGRAPHIC SIZE

[72] Inventor: Tatsuo Kobayashi, Osaka, Japan
[73] Assignee: Minolta Camera Kabushiki Kaisha, Minami-ku, Osaka, Japan
[22] Filed: May 26, 1970
[21] Appl. No.: 40,645

[30] Foreign Application Priority Data
June 3, 1969   Japan.................................44/51627

[52] U.S. Cl. ...........................................................95/31 R
[51] Int. Cl. .......................................................G03b 19/04
[58] Field of Search ................................................95/31 R

[56] References Cited
UNITED STATES PATENTS
1,001,387   8/1911   Goddard................................95/31 R Primary Examiner—Samuel S. Matthews
Assistant Examiner—Monroe H. Hayes
Attorney—Stanley Wolder

[57] ABSTRACT

A device for identifying the picture size to be taken by a camera by using a cartridge-mounted film. The device comprises a picture size identifying member operatively connected to a film winding knob of the camera, so as to rub and imprint a marking on the surface of the film cartridge in response to the rotation of the film winding knob.

5 Claims, 3 Drawing Figures

PATENTED JUN 27 1972 3,672,277

INVENTOR.
TATSUO KOBAYASHI
BY
Stanley Wolder
atty

DEVICE FOR IDENTIFYING PHOTOGRAPHIC SIZE

This invention relates to a device for identifying photographic size, and more particularly to a device for marking a film patrone or cartridge which marking identifies the size of each picture frame taken by a camera. The device includes a rotary picture size identifying member resiliently mounted on a camera so as to extend between a film winding knob of the camera and a film cartridge mounted in the camera, whereby a size-identifying mark is imprinted on the surface of the cartridge by the identifying member upon rotation thereof.

It is well known that a roll film mounted on a cartridge can be used for taking pictures of two or more different sizes, depending on the camera being used. For instance, Japanese Industrial Standard (to be referred to as "JIS", hereinafter for smplicity's sake) -K7538 defines two photographic picture sizes for the so-called 35mm roll film mounted in a cartridge; namely, a full size (24 × 36mm) and a half size (18 × 24mm). Similarly, JIS-B7176 defines two sizes for a cartridge 16mm film; namely, a comparatively small size of 10 × 14mm and a comparatively large size of 12 × 17mm.

When a film loaded in a cartridge is exposed, one cannot tell the size of individual pictures taken on the film, unless the photographer who has taken the pictures on the film tells it. In other words, there has not been any identification provided on a film cartridge representing the individual picture size taken by the film loaded in the cartridge.

On the other hand, the use of automatic film developing and printing devices has been ever increasing these days. If a means is provided for identifying the picture size at a glance of the cartridge, the efficiency of automatic developers and automatic printers will be improved by separately processing films carrying pictures of different sizes.

Therefore, an object of the present invention is to provide a device for imprinting an identification mark on a film cartridge for facilitating the identification of the picture size on the film in the cartridge, so that one can distinguish one picture size from the other at a glance of the cartridge before the development of the film. With currently used cameras, the choice of the picture size for a given cartridge-mounted film is limited to one out of two sizes at most. Accordingly, at the present, it will be sufficient to provide a picture size identifying means on those cameras which take pictures of one of the two sizes of the film to be loaded in the camera, so that film cartridges exposed by means of such cameras may be furnished with marks identifying the selected picture size. The device of the present invention is to automatically imprint such marks on the film cartridge when it is loaded in and exposed with a camera of a selected picture size.

Other objects and advantages of the present invention may be appreciated by referring to the following description, taken in conjunction with the accompanying drawings, in which.

Like parts are designated by like numerals throughout the drawings.

Figure 1:
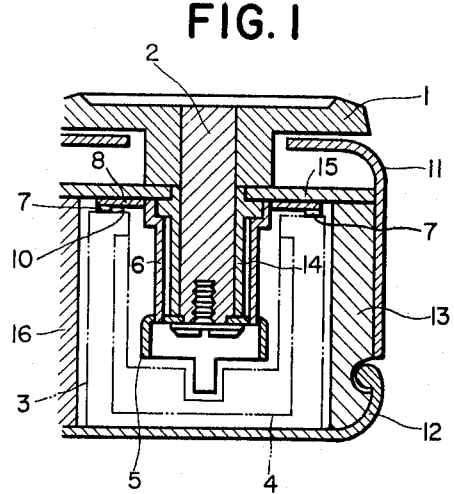
FIG. 1 is a partial sectional view of a camera, illustrating a picture size identifying device of the invention mounted thereon.
Figure 2:
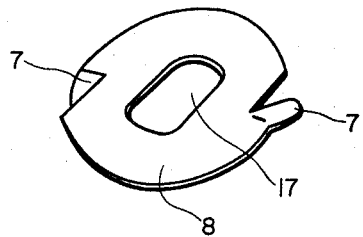
FIG. 2 is a perspective view of a picture size identifying member usable in the device of the present invention.
Figure 3:
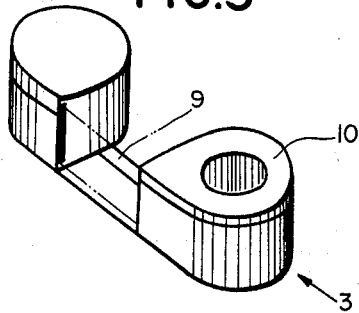
FIG. 3 is a perspective view of a film cartridge to be provided with an identification mark scratched by the device of the present invention.

FIG. 1 shows the film mounting portion of a camera for taking 12 × 17mm pictures by using a cartridge-mounted 16mm film, according to JIS-B7178, which camera includes a device of the present invention. It should be understood that the camera is for illustration only, and the present invention is not restricted to the use in such a particular type of camera. A film winding knob 1 of the camera has a shaft 2 which may extend into the winding spool 4 of a film cartridge 3 made of any suitable plastic material (FIG. 3), and a claw 5 is integrally secured to the shaft 2 so as to operatively engage the winding spool 4 of the cartridge. A picture size identifying member 8, as shown in FIG. 2, is secured to one end of a connecting sleeve 6, which is in turn fixed to the claw 5 at the opposite end thereof. Referring to FIG. 2, the picture size identifying member 8 is of disk-like shape and has an elongated slot 17 bored through the central portion thereof for the engagement with the sleeve 6. The member 8 also includes a pair of resilient bent portions 7 formed at diametrically opposite portions thereof, so as to obliquely extend in a direction toward the claw 5. The position of the two bent portions 7 is so selected that when a film 9 mounted in the cartridge 3 is wound in response to the rotation of the knob 1, the bent portions 7 rotate together with the knob 1 for rubbing or scratching the top surface 10 of that portion of the cartridge 3 which houses the film winding spool 4. The shape of the bent portions 7 is such that a suitable mark is imprinted on the top surface 10 of the cartridge upon such rubbing, for identifying the aforesaid 12 × 17mm size of the picture taken by the camera.

The location of such a mark is not restricted to the top surface of the cartridge 3, but it can be imprinted on any other suitable portions thereof. For instance, such a mark can be imprinted on the side surface or the bottom surface of the cartridge 3 by suitably modifying the configuration of the picture size identifying member 8.

In FIG. 1, the reference numeral 11 designates a camera housing, which is engageable with a back lid 12. The housing 11 also houses a camera body 16 comprising a frame 14, a bearing 15, and a cartridge holder 13.

In operation of the identifying device of the aforesaid construction, in response to the manual rotation of the knob 1 for film winding, the claw 5 rotates together with the shaft 2 so as to take up the film 9 on the spool 4. At the same time, the picture size identifying member 8, which is integrally connected to the claw 5 through the sleeve 6, also rotates, so that the resilient bent portions 7 of the member 8 rubs the top surface 10 of the film cartridge with such a pressure that a mark is imprinted thereon. The mark thus imprinted represents the picture size peculiar to the camera.

As described in the foregoing disclosure, according to the present invention, there is provided a device to be mounted on a camera for imprinting a mark on a film cartridge, which mark represents or identifies the photographic size or picture size to be taken by the camera. The picture size identifying device of the present invention is simple in construction with a minimum number of parts, and can readily be mounted on a camera without modifying the internal structure thereof. Especially, in the case of the 16mm film cartridge, as defined by JIS-B7176, substantially all the conventional cameras for such cartridge-mounted film are made for 10 × 14mm pictures, and hence, the provision of the identifying device of the invention on new type cameras for 12 × 17mm pictures will ensure sufficient identifying information on the picture size for the sake of subsequent film development and printing.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a camera including a chamber for separably housing a film cartridge containing a film winding spool, a rotatable film winding member releasably engaging said spool, and a picture size identifying member rotatable with said film winding member and in marking engagement with a surface of a cartridge housed in said chamber whereby to impart a mark to said cartridge indicative of said picture size with the rotation of said film winding member.

2. The camera of claim 1 wherein said winding member is provided with a winding knob positioned externally of said camera.

3. The camera of claim 1 wherein said identifying member includes an inclined resilient element in marking engagement with said cartridge surface.

4. The camera according to claim 3, wherein the resilient element of the picture size identifying member is so disposed as to imprint the mark on the top surface of the film cartridge.

5. The camera according to claim 1, wherein the picture size identifying member is a disk-shaped member with an elongated slot bored through the central portion thereof and a pair of resilient bent portions formed on the periphery thereof at diagonally opposing portions.

* * * * *